C. D. SEYS.

Improvement in Devices for Protecting Axle Boxes from Sand and Dust.

No. 123,582.

Patented Feb. 13, 1872.

Witnesses.
A. Ruppert.
J. D. Allen

Inventor.
Cornelius D. Seys
By Theodore Mungen
Atty 123,582

UNITED STATES PATENT OFFICE.

CORNELIUS D. SEYS, OF NOKOMIS, ILLINOIS.

IMPROVEMENT IN DEVICES FOR PROTECTING AXLE-BOXES FROM SAND AND DUST.

Specification forming part of Letters Patent No. 123,582, dated February 13, 1872.

*To all whom it may concern:*

Be it known that I, CORNELIUS D. SEYS, of Nokomis, in the county of Montgomery and State of Illinois, have invented certain improvements in devices for protecting the journals and axle-boxes of wheeled vehicles, wheeled implements of agriculture, &c., from the injurious action of dust, sand, and other substances; and I hereby declare the following to be a full, clear, and exact description of the same, reference being had to the accompanying drawing making a part of this specification, in which—

Figure 1:
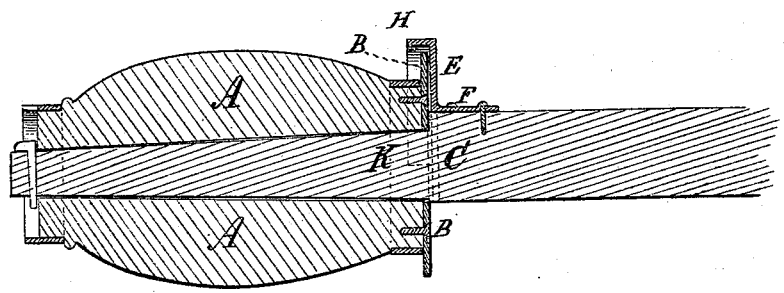
Figure 2:
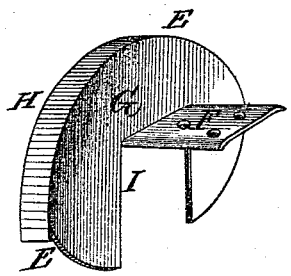

Figure 1 is a sectional view of the device, and Fig. 2 is a view, in perspective, of the shield.

This invention relates to certain improvements in devices for protecting the journals and axle-boxes of wheeled vehicles, wheeled implements of agriculture, &c., from the injurious action of dust, sand, and other substances; and consists of an annular disk secured to the end of the hub next to the axle, or of a flange cast or turned upon the end of the hub next to the axle, in combination with a shield secured to the axle in proximity to the annular disk or flange, as will hereinafter more fully appear.

In the drawing, A is the hub. B is the annular disk or flange, which is secured to or cast or turned upon the end of the hub A nearest the axle C. The shield E is secured to the axle C through the flange F, and consists of a nearly semicircular-shaped plate, G, provided with a semicircular flange, H, and a rectangular space, I, to fit over the axle C immediately at its shoulder. The shield E should be greater than a semicircle, and its under side should come in the same plane with the under surface of the axle C. When the journal K is inserted into the axle-box the shield E and annular disk or flange B are in proximity; and the flange H, projecting over the edge of the disk or flange B, prevents dust, sand, or other injurious substances from falling upon the journal K and penetrating the axle-box.

Having thus described my improvement, what I claim as new and useful, and desire to secure by Letters Patent, is—

The annular disk B on the end of the hub next the axle in combination with the shield E, composed of the plate G provided with the flanges H and F and the space I, as described, for the purpose hereinbefore set forth.

In testimony that I claim the foregoing improvement in devices for protecting the journals, &c., of wheeled vehicles, as above described, I have hereunto set my hand and seal.

CORNELIUS D. SEYS. [L. S.]

Witnesses:
 HENRY G. YOUNG,
 HENRY C. GAMBLE.